United States Patent
Mozaffari

(10) Patent No.: US 11,204,946 B2
(45) Date of Patent: Dec. 21, 2021

(54) FINDING OBJECTS IN A KEY-BASED DATA STRUCTURE BY THEIR APPROXIMATE LOCATION

(71) Applicant: Red Hat, Inc., Raleigh, NC (US)

(72) Inventor: Babak Mozaffari, Santa Monica, CA (US)

(73) Assignee: Red Hat, Inc., Raleigh, NC (US)

( * ) Notice: Subject to any disclaimer, the term of this patent is extended or adjusted under 35 U.S.C. 154(b) by 403 days.

(21) Appl. No.: 14/632,977

(22) Filed: Feb. 26, 2015

(65) Prior Publication Data

US 2016/0253355 A1   Sep. 1, 2016

(51) Int. Cl.
*G06F 16/29* (2019.01)
*G06F 16/16* (2019.01)
*G06F 16/26* (2019.01)

(52) U.S. Cl.
CPC .............. *G06F 16/29* (2019.01); *G06F 16/26* (2019.01)

(58) Field of Classification Search
USPC ........................................................ 707/758
See application file for complete search history.

(56) References Cited

U.S. PATENT DOCUMENTS

| | | | |
|---|---|---|---|
| 5,848,373 A * | 12/1998 | DeLorme | G01C 21/20 340/990 |
| 5,968,109 A * | 10/1999 | Israni | G06F 16/29 707/999.102 |
| 6,202,023 B1 * | 3/2001 | Hancock | G01C 21/26 701/516 |
| 6,308,177 B1 | 10/2001 | Israni et al. | |
| 6,684,219 B1 * | 1/2004 | Shaw | G06F 16/29 |
| 6,917,878 B2 | 7/2005 | Pechatnikov et al. | |
| 7,158,878 B2 | 1/2007 | Rasmussen et al. | |
| 7,167,856 B2 * | 1/2007 | Lawder | G06F 16/2264 |
| 7,751,971 B2 | 7/2010 | Chang et al. | |
| 7,945,546 B2 * | 5/2011 | Bliss | G01C 21/367 707/705 |
| 8,352,185 B2 | 1/2013 | Van Essen | |

(Continued)

FOREIGN PATENT DOCUMENTS

CN          103456233          12/2013

OTHER PUBLICATIONS

Title: Dividing Geographical region into equal sized grid and retrieving indexing position: Date: "asked Jul. 28, 2018 at 16:21": Author: Arif Khan https://stackoverflow.com/questions/51573164/dividing-geographical-region-into-equal-sized-grid-and-retrieving-indexing-posit (Year: 2018).*

(Continued)

*Primary Examiner* — Tamara T Kyle
*Assistant Examiner* — Raheem Hoffler
(74) *Attorney, Agent, or Firm* — Lowenstein Sandler LLP

(57) ABSTRACT

Object identification is described. A processor identifies a first cell of a rectangular grid overlapped over a map of a certain geographic area. The first cell corresponds to a given geographic location. The processor identifies a second cell of the grid, the second cell having a center located within a certain distance of a center of the first cell. The processor identifies one or more objects associated with the second cell by using geographic coordinates of the center of the second cell as a lookup key to identify one or more entries of a data structure that stores object information.

19 Claims, 8 Drawing Sheets

(56) References Cited

U.S. PATENT DOCUMENTS

| | | | |
|---|---|---|---|
| 8,504,393 B2* | 8/2013 | Stewart | G06Q 30/0282 |
| | | | 705/35 |
| 8,634,860 B2* | 1/2014 | Huang | H04W 64/00 |
| | | | 342/357.4 |
| 9,069,793 B2* | 6/2015 | Kadowaki | G06F 17/30241 |
| 9,104,201 B1* | 8/2015 | Pillai | B64C 39/024 |
| 9,426,620 B2* | 8/2016 | Xu | H04L 67/18 |
| 2003/0033273 A1* | 2/2003 | Wyse | G06F 16/9537 |
| 2004/0049340 A1 | 3/2004 | Usui | |
| 2005/0203937 A1* | 9/2005 | Nomura | G09B 29/00 |
| 2008/0125965 A1* | 5/2008 | Carani | G07C 5/008 |
| | | | 701/408 |
| 2008/0172173 A1* | 7/2008 | Chang | G01C 21/30 |
| | | | 701/408 |
| 2009/0227270 A1 | 9/2009 | Naaman | |
| 2011/0202538 A1* | 8/2011 | Salemann | G06F 16/29 |
| | | | 707/741 |
| 2012/0109944 A1* | 5/2012 | Hao | G06F 16/29 |
| | | | 707/723 |
| 2012/0173509 A1* | 7/2012 | Bennett | G06F 17/30241 |
| | | | 707/709 |
| 2013/0030699 A1* | 1/2013 | Barnes | G01C 21/367 |
| | | | 701/455 |
| 2013/0053023 A1* | 2/2013 | Meredith | H04W 24/08 |
| | | | 455/423 |
| 2013/0183998 A1* | 7/2013 | Pylappan | H04W 4/02 |
| | | | 455/456.1 |
| 2014/0089336 A1* | 3/2014 | Seefeld | G06F 17/30241 |
| | | | 707/758 |
| 2014/0164415 A1* | 6/2014 | Duleba | G06F 16/29 |
| | | | 707/758 |
| 2014/0317086 A1* | 10/2014 | James | G06F 16/29 |
| | | | 707/715 |
| 2016/0091319 A1* | 3/2016 | Bonnell | G06F 16/29 |
| | | | 701/461 |

OTHER PUBLICATIONS

Title: Photogrammetric Engineering & Remote Sensing: Implementation of an Equal-area Gridding Method for Global-scale Image Archiving Author: Jeong Chang Seong; Date: May 2005; pp. 623-627 (Year: 2005).*

C. Asanya et al., "Anonymous Retrieval of k-NN POI in Location Based Services (LBS)," Department of Electrical Engineering and Computer Science, University of Central Florida, 2013, 7 pages, Internet: <http://weblidi.info.unlp.edu.ar/WorldComp2013-Mirror/p2013/SAM9741.pdf>.

Andrew Jagoe, Mobile Location Services: The Definitive Guide, 2005, 1 page, vol. 1, Prentice Hall Professional, Internet: http://books.google.co.in/books?id=8VX5_RH8oc8C&printsec=frontcover#v=onepage&q&f=false).

* cited by examiner

300

| Key | Value |
|---|---|
| 20N, 90W | OBJECT_SET_A |
| 30N, 90W | OBJECT_SET_B |
| 30N, 90W | OBJECT_SET_C |
| ... | |
| KEY_n | OBJECT_SET_n |

| Key | Value |
|---|---|
| COORDINATES_A | Data |
| COORDINATES_B | Data |
| COORDINATES_C | Data |
| | |
| COORDINATES_n | Data |

| Key | Value A | Value B |
|---|---|---|
| 20N, 90W | OBJECT_SET_A | UUID_1 |
| 30N, 90W | OBJECT_SET_B | UUID_2 |
| 30N, 90W | OBJECT_SET_C | UUID_3 |
| | ... | |
| KEY_n | OBJECT_SET_n | UUID_n |

| Key | Value |
|---|---|
| UUIID_1 | Data |
| UUIID_2 | Data |
| UUIID_3 | Data |
| ... | |
| UUIID_n | Data |

FINDING OBJECTS IN A KEY-BASED DATA STRUCTURE BY THEIR APPROXIMATE LOCATION

TECHNICAL FIELD

The present disclosure relates to an object identification system, and more particularly, to finding objects in a key-based data structure by their approximate geographical location.

BACKGROUND

Modern technological advancements have provided users with greater access to information than ever before. Many users have electronic devices such as desktop computers, laptops, smartphones or tablets that they use to access the vast amount of information available on the Internet. Some of these users may desire to use their electronic devices to find objects that are near a particular geographic location.

DESCRIPTION OF DRAWINGS

The details of one or more embodiments are set forth in the accompanying drawings and the description below. Other features and advantages will be apparent from the description and drawings, and from the claims.

FIG. 3A illustrates an example key-based data structure, in accordance with some embodiments.

FIG. 3B illustrates an example key-based data structure associated with the key-based data structure of FIG. 3A, in accordance with some embodiments.

FIG. 3C illustrates an example key-based data structure, in accordance with some embodiments.

FIG. 3D illustrates an example key-based data structure associated with the key-based data structure of FIG. 3C, in accordance with some embodiments.

DETAILED DESCRIPTION

Figure 1:
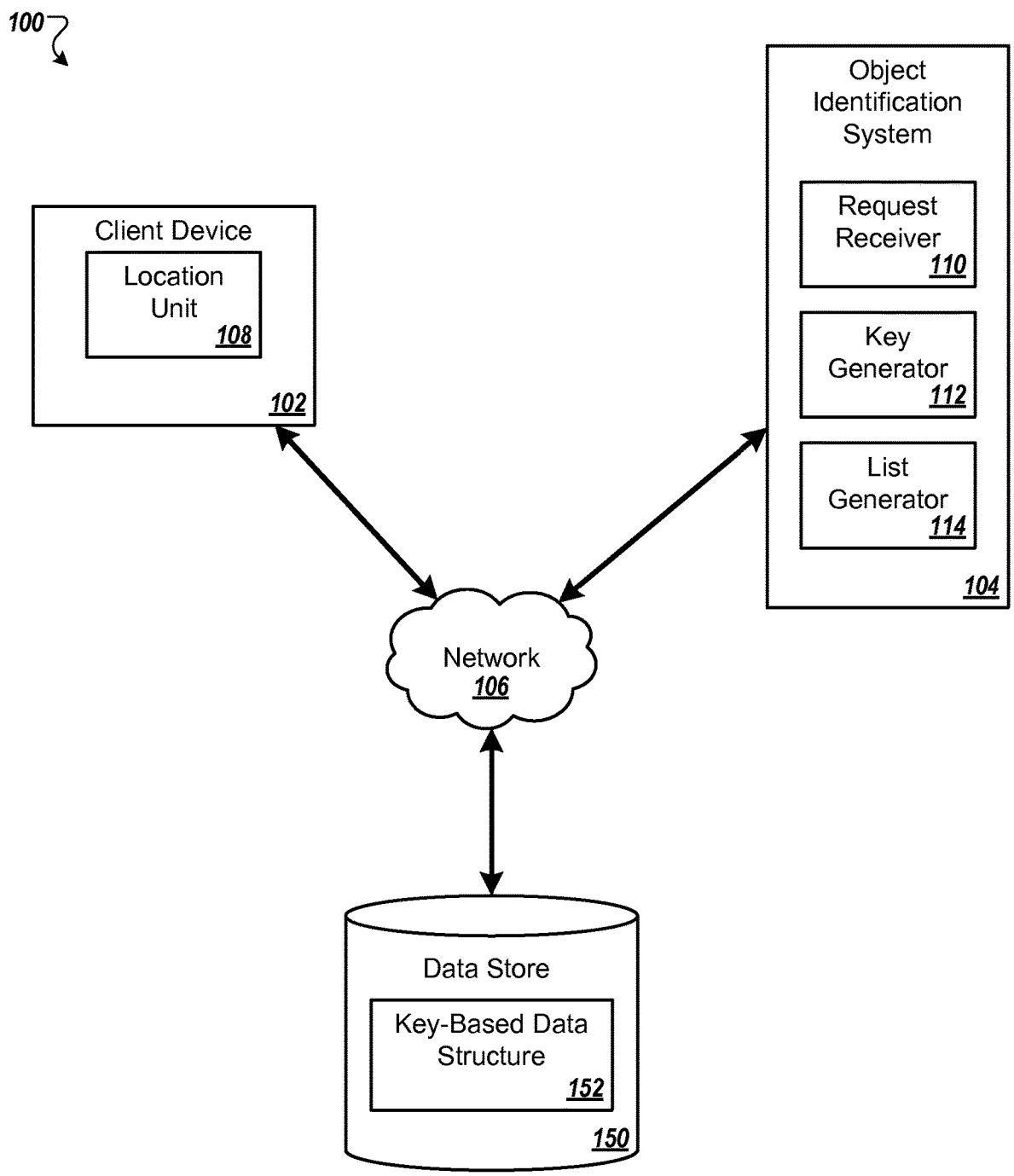
FIG. 1 is an example system architecture, in accordance with one embodiment.

Described herein are techniques for finding objects located within a certain distance of a certain geographic location using a key-based data structure that stores identifiers of objects and information about those objects. In common implementations, each object may have an associated key, which can be an exact geographical location (e.g., coordinates) of an object. The key (the exact geographical location) is used to retrieve information about the object from the key-based data structure. However, using such a data structure to identify objects that are close to a given geographic location (e.g., a location of a user device) may not be a computationally efficient solution as geographic coordinates of such objects may not necessarily coincide with the geographic coordinates of the user device location.

Aspects of the present disclosure address these and other shortcomings of conventional systems by providing a system and method for finding objects located within a certain distance of a certain geographic location (e.g., location of a client device) using a key-based data structure. The data structure may comprise a plurality of entries, such that each entry may have a key and one or more values associated with the key.

The data structure may be keyed by coordinates of cell centers of a grid that comprises a plurality of cells corresponding to non-overlapping geographic areas (e.g., squares of a known size). Coordinates of the center of each cell may be used as the key to the data structure entry that stores identifiers of the objects located within the geographic area defined by the coordinates of the center of the cell and a known cell size (e.g., 10×10 miles).

Thus, the task of identifying the objects that are located within a given distance from a certain geographic location may be solved using the above described data structure by identifying a plurality of grid cells having the centers within the given distance from the center of the grid cell which comprises the given geographic location, and using the coordinates of the centers of the cells as the keys to the data structure that stores identifiers of the objects located within the corresponding geographic areas. For each identified object, a distance from the search location may be determined (e.g., applying Pythagorean theorem to the geographic coordinates of the object and the search location), and the objects that are outside of the search radius may be discarded.

The object identification system can receive, from a client device, a request for a list of objects within a geographical area. The geographical area may be divided into map divisions of any shape or size. For example, the geographical area may be divided into cells according to a geographic coordinate system (e.g., Cartesian, polar). In some embodiments, the geographic coordinate system is a grid. The grid may have any number of cells that may be any shape (e.g., rectangle, square, trapezoid) or size. In some embodiments, the cells can correspond to latitude and longitude lines. For example, a cell can be a four-sided shape that is bounded between 28N-29N, and 97W-98W. Each cell has a unique key based on the location of the cell within the geographic coordinate system. For example, the example cell bounded between 28N-29N, and 97W-98W may have a key 29N, 98W.

The request from the client device can include a location identifier (such as geographic coordinates of the location of the client device or a user-specified location). The object identification system creates a key that corresponds to a cell using the numerical location received from the client device. For example, when the numerical location is a longitude and latitude of 29.4258° N and 98.4861° W, the object identification system can create the key by truncating and/or rounding each of the geographic coordinates. The object identification system has predetermined information on how to generate the key based on the cells in the geographic coordinate system. For example, when the cells are defined using whole numbers of latitude and longitude coordinates, the object identification system creates a key of 29N, 98W by rounding each of the geographic coordinates to the nearest whole number, which corresponds to a cell in the geographic coordinate system. In some embodiments, the geographical area can overlap multiple cells. In such embodiments, the object identification system creates a key for each cell. The object identification system uses the key(s) to retrieve the list of objects from a key-based data structure. The object identification system sends the list of objects to the client device, where the client device can present the set of objects to the user (such as in a list or on a map).

Accordingly, aspects of the disclosure include an object identification system that can identify objects in a key-based data structure using a key based on the approximate geographic location of the objects. The object identification system can retrieve information about object that are close to a geographic location (e.g., a location of a user device) without knowing the object's exact geographical location.

FIG. 1 illustrates an example system architecture 100, in accordance with one embodiment of the disclosure, for locating objects that are close in proximity to a numerical location received from a client device 102. The system architecture 100 includes at least one client device 102 coupled to an object identification system 104 via a network 106. The system architecture 100 also includes a data store 150. In one embodiment, the network 106 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one embodiment, the data store 150 may be a memory (e.g., random access memory), a cache, a drive (e.g., a hard drive), a flash drive, a database system, or another type of component or device capable of storing data. The data store 150 may also include multiple storage components (e.g., multiple drives or multiple databases) that may also span multiple computing devices (e.g., multiple server computers).

The client device 102 may include any type of computing device such as a personal computer (PCs), laptop, mobile phone, smart phone, tablet computer, netbook computer, etc. In some embodiments, the client device 102 may also be referred to as a user device. The client device 102 includes a location unit 108, which may include hardware and/or a software application that determines a numerical location. In some embodiments, the location unit 108 can determine an actual location of the client device 102 and store the actual location as the numerical location to be sent to the object identification system 104. In some embodiments, the location unit 108 is a GPS unit. In some embodiments, the location unit 108 determines the numerical location of the client device 102 using triangulation. In other embodiments, the location unit 108 determines the numerical location of the client device 102 by inheriting the location of another device (e.g., by inheriting a location of a router to which the client device 102 is connected). In further embodiments, the location unit 108 receives the numerical location from a user, such as via a graphical user interface (GUI). In these embodiments, the user can enter a location as numerical coordinates, drop a pin on a map within the GUI, or the like. The numerical location of the client device 102 can be stored on a local storage device on the client device 102. The client device 102 can send the numerical location to the object identification system 104 in a request for a set of objects in proximity to the numerical location. The client device 102 can also receive a list of objects from the object identification system 104 in response to the request and can interpret and render the objects on a geographical map within a user interface of the client device 102, as described herein.

The object identification system 104 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to identify a set of objects that are close in proximity to the client device 102 and provide a list of the identified objects to the client device 102. The identification system 104 may include a request receiver 110, a key generator 112 and a list generator 114, as described herein.

The data store 150 can be one or more persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items. The data store 150 can include one or more key-based data structures 152. The key-based data structure 152 can include multiple sets of values and each set of values can be associated with a different key. The key-based data structure 152 may be keyed by coordinates of cell centers of a geographic coordinate system (e.g., grid) that comprises a plurality of cells corresponding to non-overlapping geographic areas (e.g., squares of a known size). Coordinates of the center of each cell may be used as the key to the data structure entry that stores identifiers of the objects located within the geographic area defined by the coordinates of the center of the cell and a known cell size (e.g., 10×10 miles). Each key corresponds to one cell within a set of cells. Each cell is associated with a region of a map and the values can represent objects within the respective map division. The key-based data structure 152 is further described in conjunction with FIGS. 3A-D.

In operation of system architecture 100, the client device 102 can generate a request for a list of objects that are geographically proximate to a numerical location. For example, a user of the client device 102 may desire to receive a list of restaurants that are close to the user's geographic location. In some embodiments, the user can also specify a search radius, where the numerical location is center of the search radius. In some embodiments, the user can input the user location, such as by entering an address via a GUI. Alternatively, the location unit 108 can identify a numerical location of the user device (e.g., using GPS). The client device 102 sends the request for the list of objects to the object identification system 104. The request includes the numerical location of the user device (or a user-specified location). For example, the numerical location can be a latitude (29.4258° N) and longitude (98.4861° W). The request may also include the search radius (e.g., 3 miles).

The request receiver 110 of the object identification system 104 receives the request for the list of objects from the client device 102 along with the numerical location and search radius, if applicable. The key generator 112 creates a key using the numerical location, as further described in conjunction with FIG. 2C. The key may be used by the list generator 114 to lookup a set of objects that are associated with the key in a key-based data structure 152 (e.g., a dictionary, map). The key can be associated with a cell in a geographic coordinate system, as further described and illustrated in conjunction with FIG. 2A. Using the set of objects, the list generator 114 can use the search radius to create a list of objects from among the set of objects that are within the search radius. The object identification system 104 can send the list of objects within the search radius to the client device 102. The client device 102 can present the list of objects to the user using a GUI, for example.

Figure 2A:
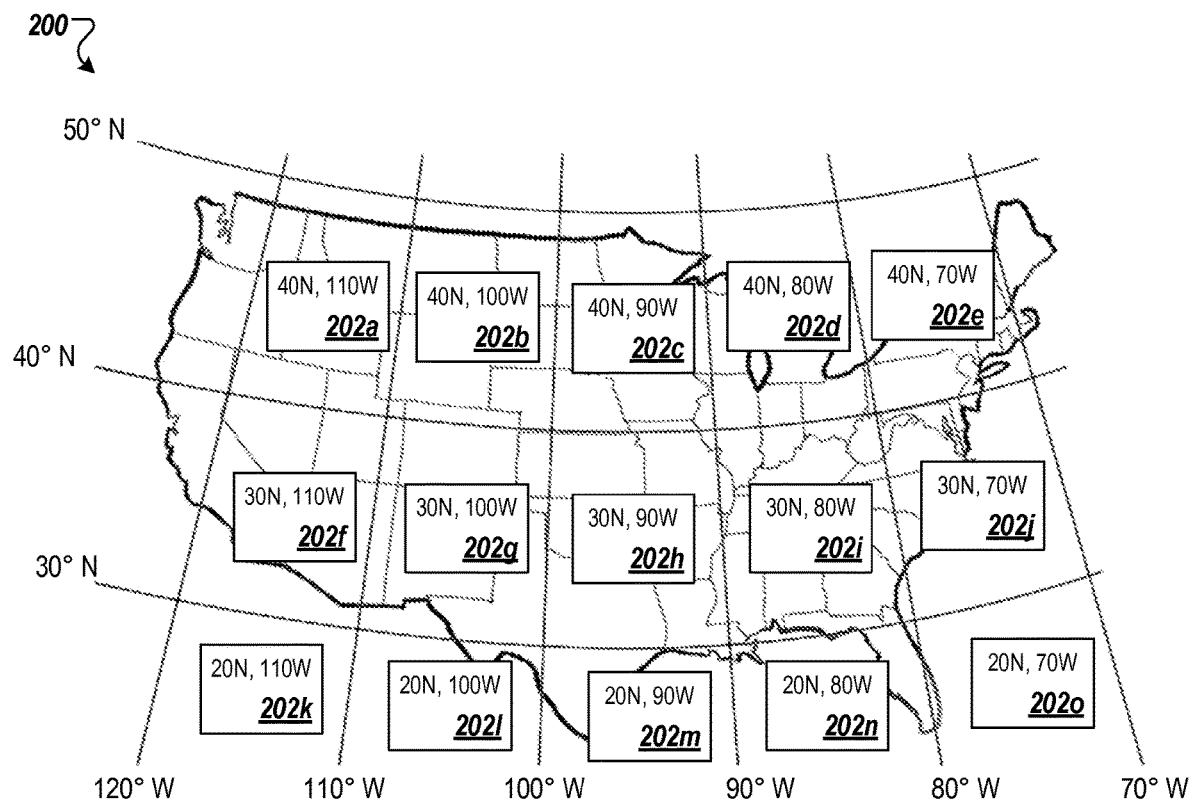
FIG. 2A illustrates a geographical map with a coordinate system that is used to define multiple map divisions in accordance with some embodiments.

FIG. 2A illustrates a geographical map 200 with a coordinate system (e.g., grid) that is used to define multiple cells 202a-o in accordance with some embodiments. For simplicity of explanation, the cells 202a-o are described and illustrated herein as being square or rectangular in shape, although any shape or size may be used. Additionally, the cells 202a-o may differ in size and shape from one to another. In some embodiments, the coordinate system uses latitude and longitude coordinates and the cells can be defined using latitude and longitude lines and/or coordinates. For example, map division 202a is a squared bounded laterally between 40° N and 50° N and vertically between 110° W and 120° W.

Each cell can have an associated key that is based on the latitude and longitude coordinates. As illustrated, cell 202a can be identified by the geographic coordinates of its center of 40N, 110W which may be used to derive a key for indexing the above referenced data structure. In some embodiments, the key is determined using the lower number of the numerical boundaries. For example, cell 202b has boundaries between 40° N and 50° N and 100° W and 110° W. Thus, using the lower numbers of the numerical boundaries, the key for cell 202b can be 40N, 100W. Accordingly, example keys for each of the cell 202a-o are provided in FIG. 2A.

Figure 2B:
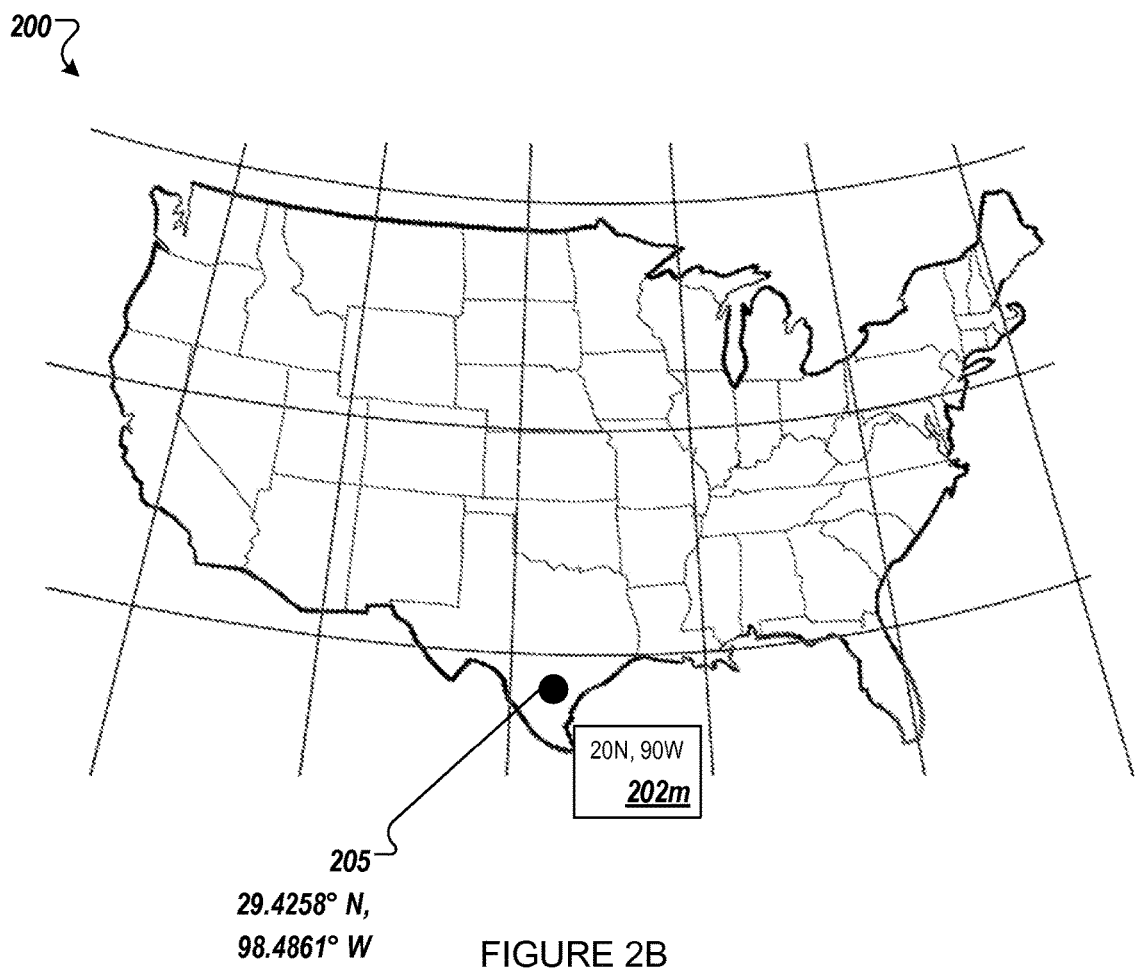
FIG. 2B illustrates the geographical map of FIG. 2A with a numerical location in accordance with some embodiments.

FIG. 2B illustrates the geographical map 200 of FIG. 2A with a numerical location 205 at 29.4258° N and 98.4861° W. As described herein, the numerical location can be a location of a client device (e.g., client device 102 of FIG. 1) or can be a user-specified location. As illustrated, the numerical location 205 is within the cell 202m, which is determined as discussed below in conjunction with FIG. 2C.

Figure 2C:
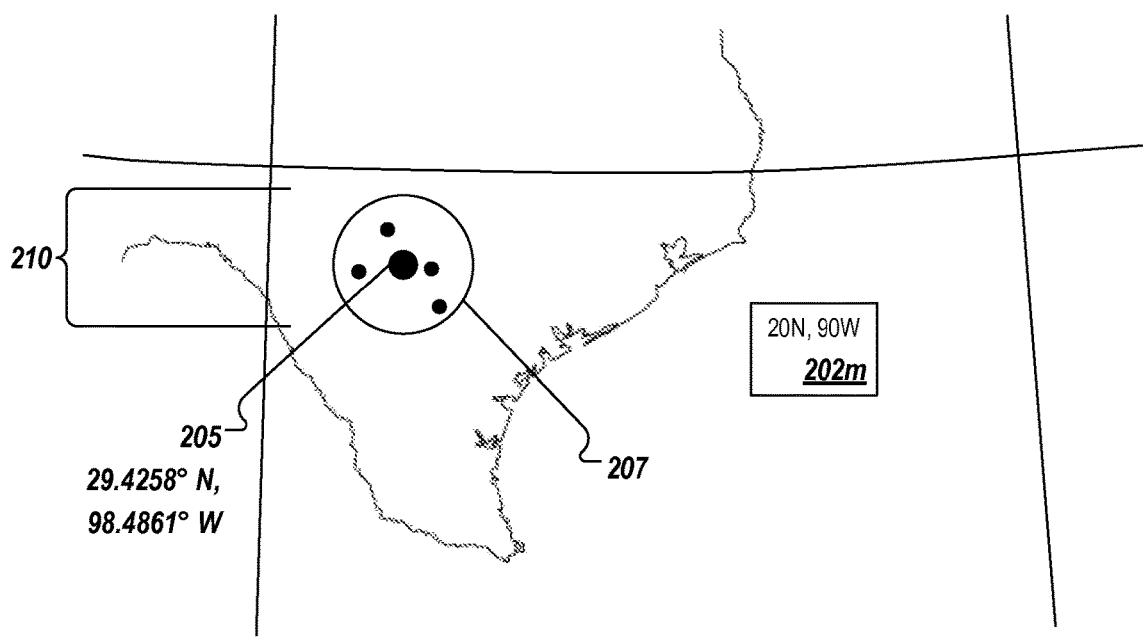
FIG. 2C illustrates a portion of the geographical map of FIG. 2A that includes the numerical location and a search radius in accordance with some embodiments.

FIG. 2C illustrates a portion of the geographical map 220 of FIG. 2A that includes the numerical location 205 with a search radius 207. The object identification system 104 of FIG. 1 can use the numerical location 205 and the search radius 207 to identify, using a key-based data structure, one or more objects 210 that may be of interest to the user, as described herein. Specifically, the object identification system 104 may use the numerical location 205 of 29.4258° N and 98.4861° W to create a key. In some embodiments, the object identification system 104 may truncate or round the numerical values of the numerical location 205 to create the key. For example, the object identification system 104 rounds the numerical location 205 to the nearest ten to 20N, 90W to create the key. The object identification system 104 may then use the key to obtain a set of objects that are associated with the key from a key-based data structure, as further described in conjunction with FIG. 3. The object identification system 104 can send the set of objects to a client device 102.

In some embodiments, the object identification system 104 obtains all objects that are associated with the key that are within a cell from the key-based data structure, even objects that may be outside of a search radius 207. For example, the object identification system 104 uses the key 20N, 90W to obtain all objects associated with that key from the key-based data structure. The object identification system 104 can identify a geographic location of each object and then determine whether its geographic location is within the search radius 207. For example, a geographical location of each of the objects may be stored in the key-based data structure and may be retrieved when retrieving information about the object. The object identification system 104 can determine whether each object is inside or outside the search radius 207 by comparing the geographical location of each object with the search radius 207. The object identification system 104 can select the objects 210 within the search radius 207 and can send their identifiers to the client device 102. In some embodiments, the object identification system 104 may discard an identified object responsive to determining that a distance from the identified object to the numerical location 205 exceeds a certain value (e.g., the object is outside the search radius 207).

Figure 2D:
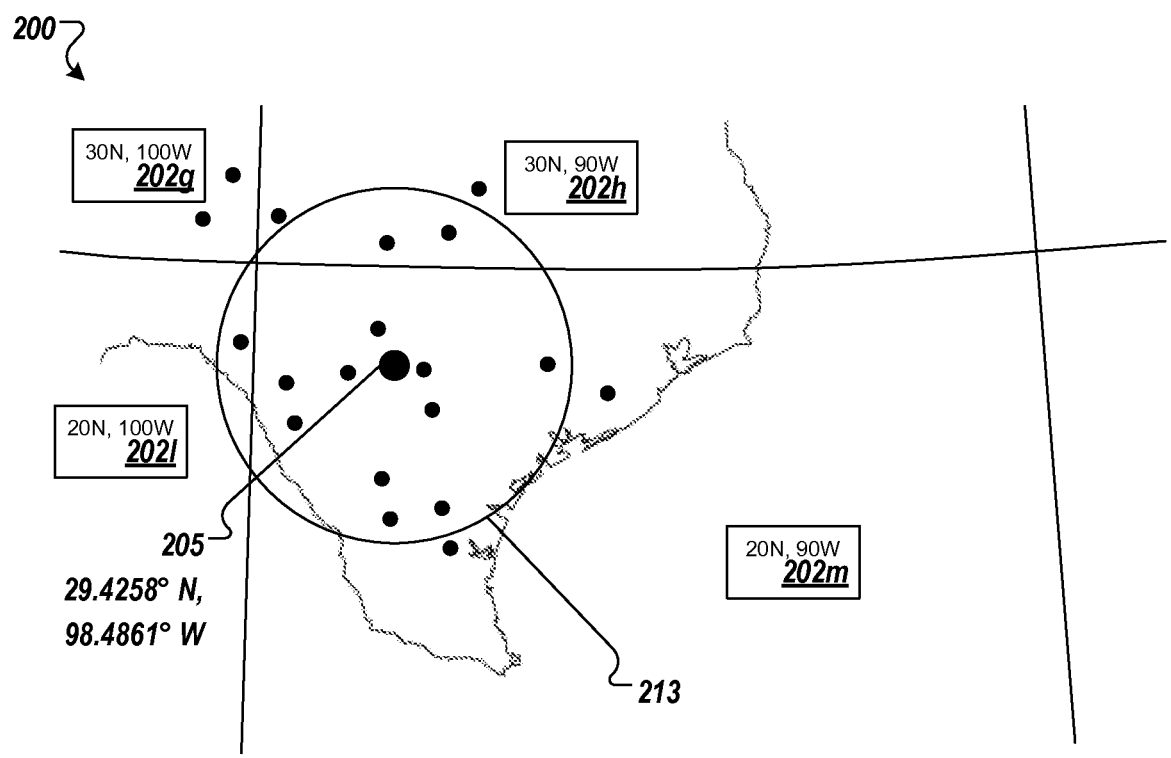
FIG. 2D illustrates a portion of the geographical map of FIG. 2A that includes the numerical location within a map division and a search radius that overlaps more than one map division in accordance with some embodiments.

FIG. 2D illustrates a portion of the geographical map 200 of FIG. 2A that includes the numerical location 205 within grid 202m and a search radius 213 that overlaps more than one cell 202g, 202h and 202l. As illustrated, the search radius 213 overlaps four cells 202g, 202h, 202l and 202m.

The object identification system 104 can use the numerical location 205 and the search radius 213 to determine which cells are covered by the search radius 213. The object identification system 104 can identify any cell 202 that are overlapped by the search radius 213. The object identification system 104 can identify the cells having centers within a certain distance (derived from the search radius 213) of the center of the cell where the numerical location 205 is located. In some embodiments, the object identification system 104 identifies cells, such as to account for a situation when the numerical location 205 is near a cell boundary. In some embodiments, the map includes keys for each cell and the object identification system 104 identifies the keys of the cells 202 that are overlapped by the search radius 213.

In some embodiments, to identify a list of objects within the search radius 213 when the search radius 213 overlaps multiple cells, the object identification system 104 can identify the key of the cell in which the user device is located (hereafter "central cell"), which is cell 202m (key=20N, 90W). The object identification system 104 can use the key of the central cell 202m to identify adjacent cells that fall within the search radius 213. Since the cells are arranged in a pattern (e.g., grid) according to a coordinate system, the object identification system 104 can increment the key of the central cell 202m to determine other adjacent cells that are within the search radius. For example, using the key 20N, 90W, the object identification system 104 can add 10N to 20N to get 30N, 90W, which is the key for the cell 202h that borders the central cell 202m on the top. Similarly, the object identification system 104 can determine keys for cells 202g (key=30N, 100W) and 202l (key=20N, 100W).

The object identification system 104 uses each of these keys to search a key-based data structure. The object identification system 104 then obtains a search result including a set of objects in each of the cells 202g, 202h, 202l and 202m, as well as geographic locations of each of the objects. Using the geographic locations of each of the objects, the object identification system 104 can compare their respective geographic locations with the search radius 213 and select objects from the set that fall within the search radius 213. As illustrated, some objects in cell 202h are within the search radius, while some are not. The object identification system 104 then creates a list of the objects from cells 202h, 202l and 202m (cell 202g had no objects within the search radius) and sends the list to the client device 102.

In some embodiments, the object identification system 104 sends additional information pertaining to each object in the list. Any type of additional information can be associated with each object. For example, when the objects are restaurants, the object identification system 104 can send additional information pertaining to hours of operation, ratings, reviews, location, etc. to the client device 102. To obtain this additional information, the object identification system 104 can query a second key-based data structure (e.g., data structure 340 or 380 of FIGS. 3B, 3D) that includes such information, as further described in conjunction with FIGS. 3B, D.

FIG. 3A illustrates an example key-based data structure 300, in accordance with some embodiments. The key-based data structure 300 includes a set of keys 302 and their corresponding values 304. Each key can identify a cell in a geographic coordinate system (e.g., cell 202 of FIGS. 2A-D) and the values 304 can identify one or more objects located within the cell. As illustrated, a key derived from the cell center coordinates of 20N, 90W corresponds to OBJECT_SET_A, which may include any number of objects. When a key is provided to the key-based data structure 300, the corresponding set of values can be returned. In some embodiments, each value in a set of values can comprise an exact location of an object (e.g., the latitude and longitude of a restaurant). Using the exact location of the object, the object identification system 104 of FIG. 1 can determine if the object is within a search radius prior to sending the object to a client device 102. Similarly, the client device can use the exact location of the object to render the location of the object on a map or in a sorted list (e.g., a list sorted according to distance from the user device).

FIG. 3B illustrates an example key-based data structure 310 associated with key-based data structure 300, in accordance with some embodiments. The key-based data structure 310 includes a set of keys 312, each of which can be a value from the set of values 304 of FIG. 3A. The key-based data structure 310 also includes at least one value 314 associated with each key 312. Each value 310 can include additional information about an object. For example, when the objects are restaurants, the additional information can be any information pertaining to the restaurant, including hours of operation, ratings, reviews, location, etc.

To send additional information about an object to a client device, the object identification system 104 can use a value 304 received from data structure 300 of FIG. 3A as the key 312 in data structure 310. The data structure 310 returns the values 314 associated with the key 312 (which is value 304) to the object identification system 104. In this manner, the object identification system 104 can receive the additional information for an object and then send it to the client device 102.

FIG. 3C illustrates another example key-based data structure 340 in accordance with some embodiments. The key-based data structure 340 includes a set of keys 342, a set of corresponding values 344 and a set of unique values (e.g., universally unique identifier (UUID)) 346 for each object. The set of keys 342 can be similar to the set of keys 302 of FIG. 3A and the set of values 344 can be similar to the set of values 304 of FIG. 3A. A UUID 346 can include a set of values (e.g., one or more alphanumeric value), where each UUID can be any type of identifier and can be randomly generated. Using the key-based data structure 340 that includes the set of UUIDs 346 can be helpful for when two similar objects are close in geographical proximity. For example, when two restaurants are next to each other, their latitude and longitude coordinates may not be granular enough to be able to uniquely identify each restaurant. Thus, to maintain a high level of granularity and to be able to identify each object separately, each object can have a universal unique identifier (UUID) 346. Similar to what was described in conjunction with FIG. 3B, the UUID 346 can be used to obtain additional information pertaining to an object from another data structure, such as data structure 350 of FIG. 3D. For example, a UUID 346 from data structure 340 can be used as a key 352 in data structure 350 to obtain additional information 354 pertaining to an object.

Figure 4:
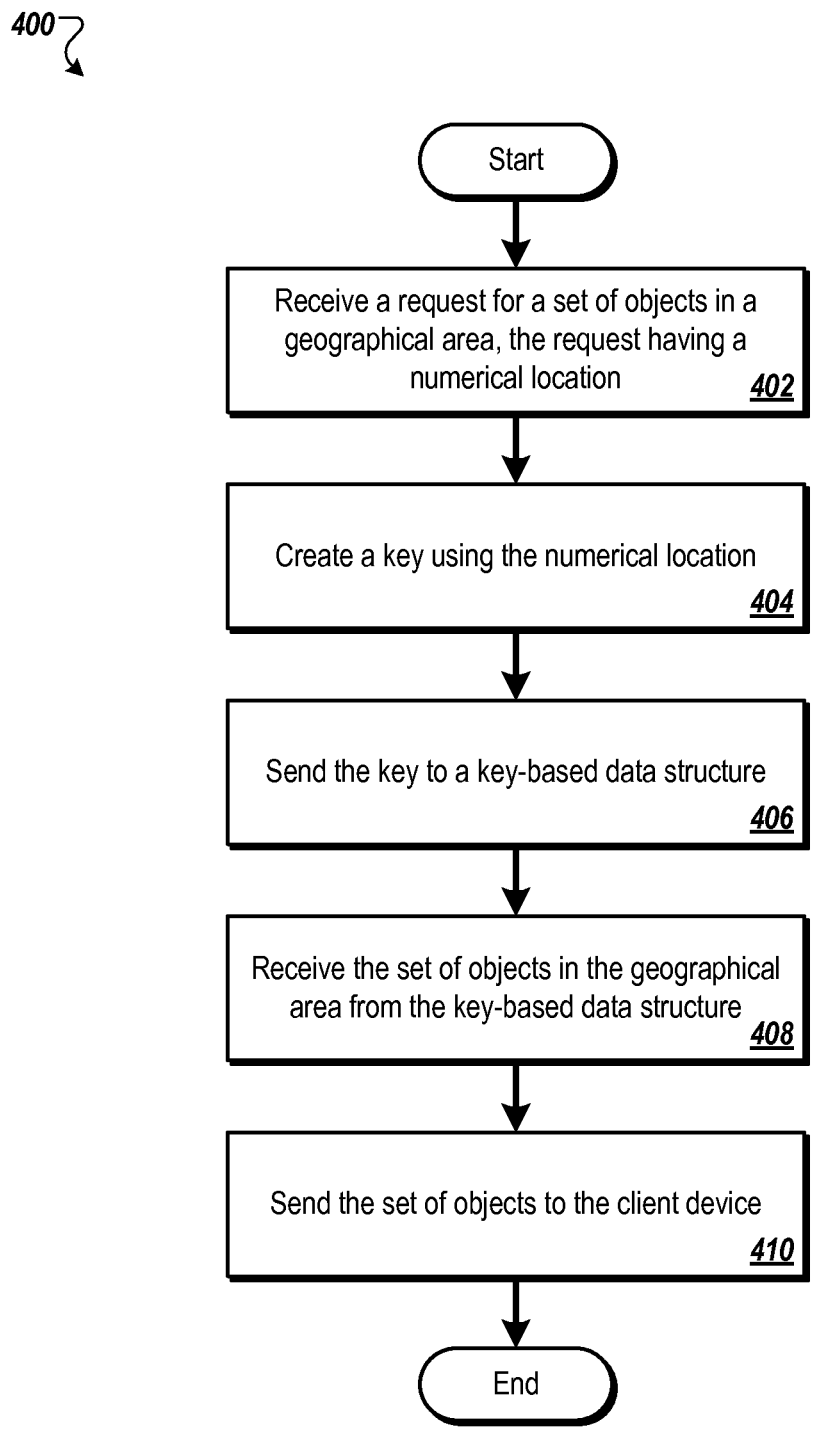
FIG. 4 is a flow diagram of a method for identifying a set of objects that are geographically proximate to a numerical location in accordance with some embodiments.

FIG. 4 is a flow diagram of a method 400 for identifying a set of objects that are geographically proximate to a numerical location in accordance with some embodiments. Method 400 can be performed by processing logic (e.g., in computing system 600 of FIG. 6) that may comprise hardware (e.g., circuitry, dedicated logic, programmable logic, microcode, etc.), software (such as instructions run on a processing device), firmware, or a combination thereof. In some embodiments, method 400 is performed primarily by an object identification system 104 of FIG. 1. For clarity of presentation, the description that follows uses the system 100 as examples for describing the method 400. However, another system, or combination of systems, may be used to perform the method 400.

Referring to FIG. 4, in one embodiment, method 400 begins at block 402 when the processing logic receives, from a client device, a request for a set of objects within a geographical area. The request can include a numerical location within a geographic coordinate system, as described herein. In some embodiments, the geographical area is a circle having a radius, where the center of the circle is the numerical location. For example, the request include a location of a user device (e.g., from the client device 102 of FIG. 1) and can be for a set of restaurants that are within a certain distance from the location of the user device.

At block 404, the processing logic creates a key using the numerical location received at block 402. In some embodiments, to create the key, the numerical location is a string of numbers (e.g., whole, decimal). In such embodiments, the processing logic can modify the string of numbers, such as by truncating or rounding the string of numbers, as described herein.

At block 406, the processing logic uses the key to search a key-based data structure. The key-based data structure can reside on a same machine as the processing logic. Alternatively, the processing logic and the key-based data structure are communicatively coupled via a network and the processing logic sends the key to the key-based data structure via the network.

At block 408, the processing logic obtains a search result including the set of objects from the key-based data structure. The set of objects can include all objects within a cell of a geographic coordinate system, as described herein. In some embodiments, the processing logic selects a subset of objects that are within the geographical area. At block 410, the processing logic sends the set of objects to the client device.

Figure 5:
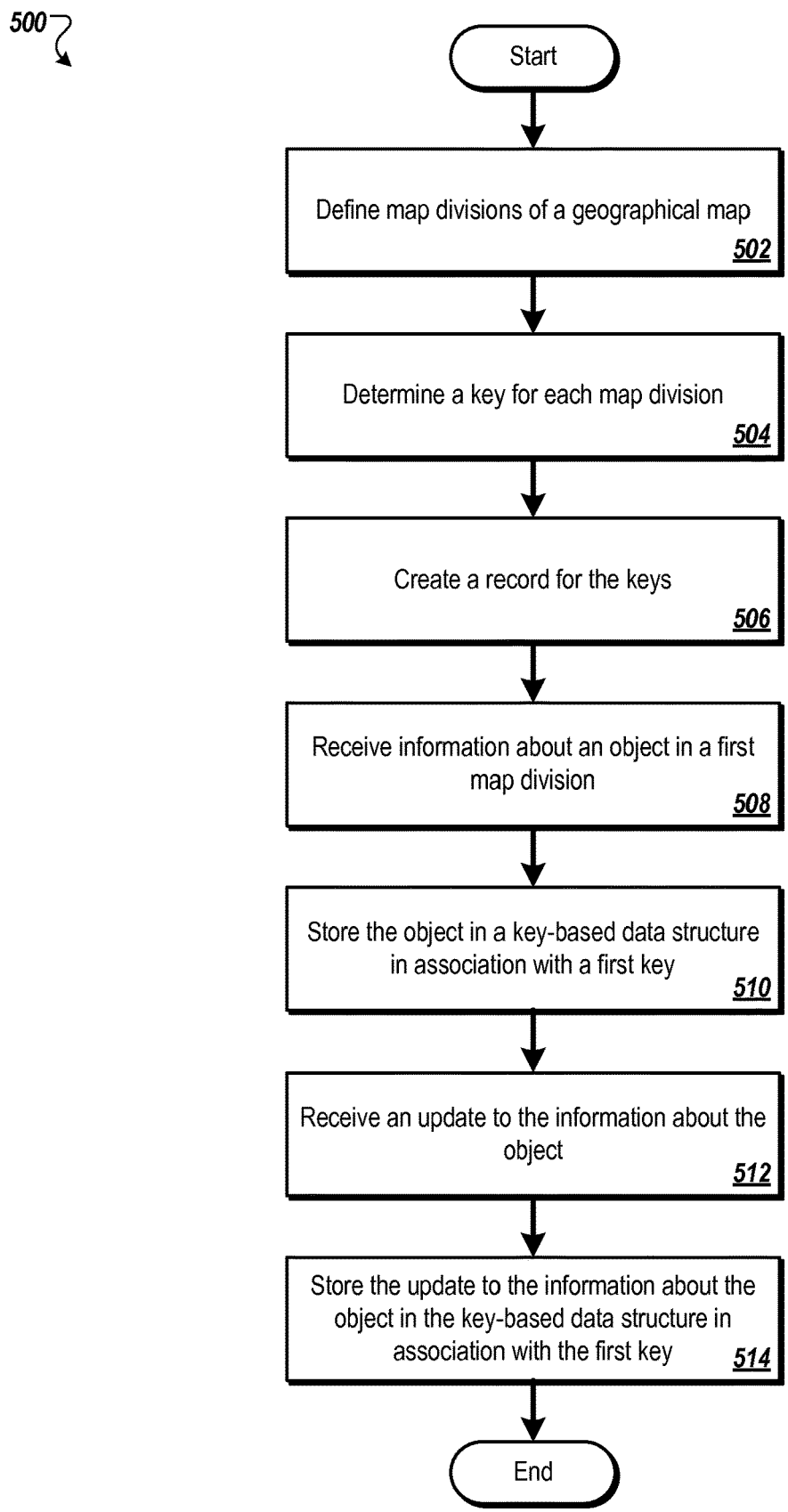
FIG. 5 is a flow diagram of a method for creating a key-based data structure in accordance with some embodiments.

FIG. 5 is a flow diagram of a method 500 for creating a key-based data structure in accordance with some embodiments. Method 500 can be performed by processing logic (e.g., in computing system 600 of FIG. 6) that may comprise hardware (e.g., circuitry, dedicated logic, programmable logic, microcode, etc.), software (such as instructions run on a processing device), firmware, or a combination thereof. In some embodiments, method 500 is performed primarily by an object identification system 104 of FIG. 1. For clarity of presentation, the description that follows uses the system 100 as examples for describing the method 400. However, another system, or combination of systems, may be used to perform the method 400.

Referring to FIG. 4, in one embodiment, method 400 begins at block 402 when the processing logic defines a coordinate system with multiple cells. For example, the processing logic may define the multiple cells 202a-o of the geographical map 200 of FIGS. 2A-D. The processing logic may define the cells using a coordinate system. For example, the processing logic may define the cells along numerical boundaries of the coordinate system. In some embodiments, the cells can correspond to latitude and longitude lines. In such embodiments, a cell can be a four-sided shape that is bounded between latitude and longitude lines. For example, a cell can be defined as being between latitude lines 28N-29N and between longitude lines 97W-98W. In some embodiments, all cells can be the same size. Alternatively, the cells can vary in size. In some embodiments, the processing logic can update the boundaries of a cell. For example, when the cell includes a large number of objects, the cell can be subdivided to include fewer objects.

At block 504, the processing logic determines a key for each cell. In some embodiments, the key is determined using the lower number of the numerical boundaries. For example, a cell may have boundaries between 40° N and 50° N and 100° W and 110° W. Using the numerical boundaries, the processing logic can define the key for cell to be 40N, 100W. Example keys for each of the cells are provided in conjunction with FIG. 2A.

At block 506, the processing logic creates a record for each of the keys in a key-based data structure. As described herein, the key-based data structure can include a key and value pair.

At block 508, the processing logic receives information about an object. In some embodiments, the processing logic receives the information about the object from a user via a user device, such as via a graphical user interface (GUI). In these embodiments, the user can enter information about the object, such as a location, drop a pin on a map within the GUI, additional details about the object, or the like. For example, the user can identify a gasoline station and can provide information (e.g., location, prices) about the gas station.

At block 508, the processing logic can use the location of the object to determine a key of a cell to associate with the information about an object. For example, the location of the object can be a longitude and latitude of 29.4258° N and 98.4861° W. The processing logic can truncate the received location to match the key format. In this example, the key format is whole-number based so the processing logic determines that the key of the cell associated with the information about the object is 29N, 98W. At block 510, the processing logic stores the information about the object in the key-based data structure in association with the key. The key can be used to retrieve the information about the object, as described herein.

At any time, the processing logic may receive an update to information that is stored in the key-based data structure (block 512). When the processing logic receives such an update to the information, the processing logic can determine a key of the cell associated with the update, and can store the update to the information in the key-based data structure (514). In some embodiments, the processing logic adds the updated information to an entry in the key-based data structure. Alternatively, the processing logic can replace any existing information in the entry with the update to the information.

Figure 6:
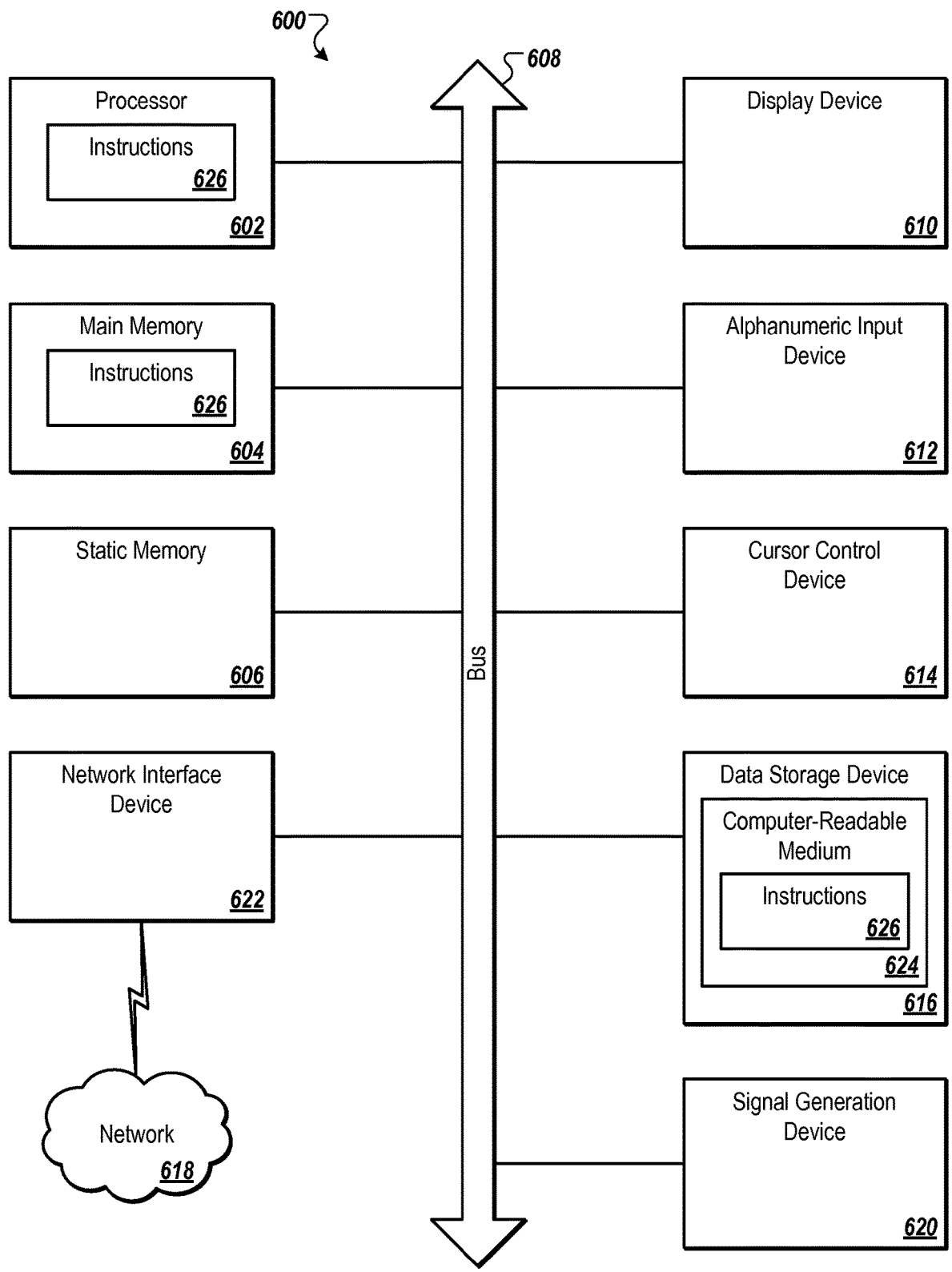
FIG. 6 illustrates an example machine of a computer system within which a set of instructions, for causing the machine to perform any one or more of the methodologies discussed herein, may be executed.

FIG. 6 illustrates an example machine of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computing system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 608.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and methods discussed herein.

The computer system 600 may further include a network interface device 622 (e.g., network adapter). The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one embodiment, the instructions 626 include instructions for an object identification system and/or a software library containing methods that call modules in an object identification system. While the machine-readable storage medium 624 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "locating" or "determining" or "self-healing" or "examining" or "comparing" or "acquiring" or "providing" or "receiving" or "updating" or "setting" or "removing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiment of the disclosure have been described with reference to specific example embodiment thereof. It will be evident that various modifications may be made thereto without departing from the broader spirit and scope of embodiment of the disclosure as set forth in the following claims. The specification and drawings are, accordingly, to be regarded in an illustrative sense rather than a restrictive sense.

What is claimed is:

1. A method comprising:
   determining a first lookup key for a first cell of a grid overlapped over a map of a geographic area and a second lookup key for a second cell of the grid;
   assigning the first lookup key to a first set of entries corresponding to a first plurality of objects located within the first cell and the second lookup key to a second set of entries corresponding to a second plurality of objects located within the second cell;
   storing, in a first key-based data structure, the first set of entries associated with the first lookup key and the second set of entries associated with the second lookup key, wherein each entry of the first set of entries and the second set of entries of the first key-based data structure comprises one or more corresponding values of attributes of a corresponding object;
   receiving, from a user device, a request for one or more objects located within a search distance from a given geographic location, wherein the one or more objects are each assigned a corresponding lookup key;
   determining, by rounding each of geographic coordinates of the given geographic location, that the geographic coordinates specify a point located within the first cell associated with the first lookup key;
   determining that a second center of the second cell of the grid is within the search distance of a first center of the first cell;
   retrieving, from the first key-based data structure using the first lookup key and the second lookup key responsive to the second center being within the search distance of the first center, a plurality of entries comprising the first set of entries and the second set of entries;
   identifying a first subset of the plurality of entries corresponding to one or more first objects that are located within the search distance of the given geographic location associated with the request and a second subset of the plurality of entries corresponding to one or more second objects that are not located within the search distance of the given geographic location associated with the request; and providing, to the user device, the first subset of the plurality of entries without providing the second subset of the plurality of entries in response to the request for the one or more objects located within the search distance from the given geographic location associated with the request.

2. The method of claim 1, wherein the given geographic location is a location of the user device.

3. The method of claim 1, wherein the determining that the geographic coordinates of the given geographic location specify the point located within the first cell comprises:
creating a key by rounding each of the geographic coordinates of the given geographic location; and
identifying the first cell using the key.

4. The method of claim 1 further comprising:
storing, in a second key-based data structure, corresponding additional information associated with a corresponding key, the corresponding key being from the first key-based data structure, the corresponding additional information being pertaining to the corresponding object associated with the corresponding key from the first key-based data structure; and
retrieving, from the second key-based data structure using the corresponding key, the corresponding additional information for each of the one or more objects.

5. The method of claim 1 further comprising creating the first key-based data structure by identifying lookup keys associated with a plurality of objects corresponding to the map of the geographic area, wherein each lookup key is derived from corresponding geographic coordinates of the corresponding object.

6. The method of claim 1, wherein the first cell and the second cell are non-overlapping.

7. The method of claim 1, wherein the first lookup key corresponds to first geographic coordinates of the first center of the first cell, and wherein the second lookup key corresponds to second geographic coordinates of the second center of the second cell.

8. The method of claim 1, wherein the geographic coordinates is a string of numbers, wherein the rounding of the geographic coordinates comprises rounding each number of the string of numbers.

9. A system comprising:
a memory; and
a processor operatively coupled to the memory, the processor to:
determine a first lookup key for a first cell of a grid overlapped over a map of a geographic area and a second lookup key for a second cell of the grid;
assign the first lookup key to a first set of entries corresponding to a first plurality of objects located within the first cell and the second lookup key to a second set of entries corresponding to a second plurality of objects located within the second cell;
store, in a first key-based data structure, the first set of entries associated with the first lookup key and the second set of entries associated with the second lookup key, wherein each entry of the first set of entries and the second set of entries of the first key-based data structure comprises one or more corresponding values of attributes of a corresponding object;
receive, from a user device, a request for one or more objects located within a search distance from a given geographic location, wherein the one or more objects are each assigned a corresponding lookup key;
determine, by rounding each of geographic coordinates of the given geographic location, that the geographic coordinates specify a point located within the first cell associated with the first lookup key;
determine that a second center of the second cell is within the search distance of a first center of the first cell;
retrieve, from the first key-based data structure using the first lookup key and the second lookup key responsive to the second center being within the search distance of the first center, a plurality of entries comprising the first set of entries and the second set of entries;
identify a first subset of the plurality of entries corresponding to one or more first objects that are located within the search distance of the given geographic location associated with the request and a second subset of the plurality of entries corresponding to one or more second objects that are not located within the search distance of the given geographic location associated with the request; and
provide, to the user device, the first subset of the plurality of entries without providing the second subset of the plurality of entries in response to the request for the one or more objects located within the search distance from the given geographic location associated with the request.

10. The system of claim 9, wherein the given geographic location is a location of the user device.

11. The system of claim 9, wherein to determine that the geographic coordinates of the given geographic location specify the point located within the first cell, the processor is further to create a key by rounding each of the geographic coordinates of the given geographic location and identify the first cell using the key.

12. The system of claim 9, wherein the processor is further to:
store, in a second key-based data structure, corresponding additional information associated with a corresponding key, the corresponding key being from the first key-based data structure, the corresponding additional information being pertaining to the corresponding object associated with the corresponding key from the first key-based data structure; and
retrieve, from the second key-based data structure using the corresponding key, the corresponding additional information for each of the one or more objects.

13. The system of claim 9, wherein the processor is further to create the first key-based data structure by identifying lookup keys associated with a plurality of objects corresponding to the map of the geographic area, wherein each lookup key is derived from corresponding geographic coordinates of the corresponding object.

14. The system of claim 9, wherein the processor is further to create the first key-based data structure by generating unique identifiers associated with a plurality of objects corresponding to the map of the geographic area, wherein each unique identifier is unique to the corresponding object.

15. A non-transitory computer readable storage medium that, when executed by a processor, cause the processor to:
determine a first lookup key for a first cell of a grid overlapped over a map of a geographic area and a second lookup key for a second cell of the grid;
assign the first lookup key to a first set of entries corresponding to a first plurality of objects located within the first cell and the second lookup key to a second set of entries corresponding to a second plurality of objects located within the second cell;

store, in a first key-based data structure, the first set of entries associated with the first lookup key and the second set of entries associated with the second lookup key, wherein each entry of the first set of entries and the second set of entries of the first key-based data structure comprises one or more corresponding values of attributes of a corresponding object;

receive, from a user device, a request for one or more objects located within a search distance from a given geographic location, wherein the one or more objects are each assigned a corresponding lookup key;

determine, by rounding each of geographic coordinates of the given geographic location, that the geographic coordinates specify a point located within the first cell associated with the first lookup key;

determine that a second center of the second cell is within the search distance of a first center of the first cell;

retrieve, from the first key-based data structure using the first lookup key and the second lookup key responsive to the second center being within the search distance of the first center, a plurality of entries comprising the first set of entries and the second set of entries;

identify a first subset of the plurality of entries corresponding to one or more first objects that are located within the search distance of the given geographic location associated with the request and a second subset of the plurality of entries corresponding to one or more second objects that are not located within the search distance of the given geographic location associated with the request; and provide, to the user device, the first subset of the plurality of entries without providing the second subset of the plurality of entries in response to the request for the one or more objects located within the search distance from the given geographic location associated with the request.

16. The non-transitory computer readable storage medium of claim 15, wherein the given geographic location is a location of the user device.

17. The non-transitory computer readable storage medium of claim 15, wherein to determine that the geographic coordinates of the given geographic location specify the point located within the first cell, the processor is further to create a key by rounding each of the geographic coordinates of the given geographic location and identify the first cell using the key.

18. The non-transitory computer readable storage medium of claim 15, wherein the processor is further to:
store, in a second key-based data structure, corresponding additional information associated with a corresponding key, the corresponding key being from the first key-based data structure, the corresponding additional information being pertaining to the corresponding object associated with the corresponding key from the first key-based data structure; and
retrieve, from the second key-based data structure using the corresponding key, the corresponding additional information for each of the one or more objects.

19. The non-transitory computer readable storage medium of claim 15, wherein the processor is further to create the first key-based data structure by identifying lookup keys associated with a plurality of objects corresponding to the map of the geographic area, wherein each lookup key is derived from corresponding geographic coordinates of the corresponding object.

* * * * *